Fig. 1a

United States Patent Office 3,253,202
Patented May 24, 1966

3,253,202
ELECTRONIC CONTROL CIRCUIT FOR THREE-PHASE LOAD DEVICE
Ronald K. Cotton, Milwaukee, Wis., assignor to Cutler-Hammer, Inc., Milwaukee, Wis., a corporation of Delaware
Filed Feb. 23, 1962, Ser. No. 174,992
14 Claims. (Cl. 318—227)

This invention relates to electrical systems for controlling transfer of energy from an alternating current supply source to a load device. More particularly, the invention relates to electrical control systems affording adjustable and reversible energization of a load device from an alternating current source.

While not limited thereto, the invention is especially applicable to hoist systems for controlling the hoisting and lowering speeds of a wound-rotor, alternating current motor such as a plural-phase, slip-ring induction motor by adjustably controlling the primary or stator voltage.

An object of the invention is to provide improved means for controlling transfer of electrical energy from an alternating current supply source to a load device.

A more specific object of the invention is to provide improved motor control means.

Another specific object of the invention is to provide improved means for controlling adjustable and reversible energization of the primary winding of an alternating current motor.

Another specific object of the invention is to provide improved means for controlling the hoisting and lowering speeds of a wound-rotor, slip-ring induction motor in a reversible motor hoist system.

Another specific object of the invention is to provide an improved control system for a wound-rotor induction motor wherein the voltage loss in the motor primary control circuit which causes a torque loss is decreased.

A further object of the invention is to provide an improved adjustable speed and reversing control system for a hoist motor of the wound-rotor, induction type which is small in size and weight, has low control power requirements and fast response time and reduces electrical leakage between the power lines connecting the alternating current supply source to the motor.

Other objects and advantages of the invention will hereinafter appear.

According to the invention, there is provided a control system connectable to a three-phase alternating current supply source for adjustably controlling the primary or stator voltage of a three-phase wound-rotor motor of the slip-ring type whereby to adjust the speed of the motor in reverse directions or hoisting and lowering directions in a hoist control system. The control system comprises silicon controlled rectifiers connected in a circuit in reverse-parallel relation in each of two of the three power supply lines for controlling motor energization in the hoisting direction. Silicon controlled rectifiers are also cross-connected in circuits in reverse-parallel relation between the same two of the three power supply lines for controlling motor energization in the lowering direction. A static control circuit is provided for the silicon controlled rectifiers of each such reverse-parallel circuit to control gating or firing of the silicon controlled rectifiers in the proper order. Each such static control circuit is provided with means to cause firing of the associated silicon controlled rectifiers under the control of the sum of two control voltages. One of these control voltages is proportional to the integrated volt-seconds appearing across the silicon controlled rectifiers to be fired. The other of these voltages is selectively and continuously adjustable and is derived from a speed control circuit. This other voltage is an "error" voltage which is the algebraic sum of a selectively and steplessly adjustable reference voltage and a feedback voltage proportional to motor speed derived from a tachometer generator or the like driven by the motor. The static control circuits associated with hoisting speed control are also provided with means for applying thereto voltages from across different lowering control silicon controlled rectifiers to operate respective blocking control circuits to prevent short-circuits between the associated power supply lines if both the hoisting control and lowering control silicon control rectifiers attempt to conduct current at the same time. Similarly, the static control circuits associated with lowering speed control are provided with means for applying thereto voltages from across different hoisting control silicon controlled rectifiers to operate respective blocking control circuits to prevent short-circuits between the associated power supply lines if both the lowering control and hoisting control silicon controlled rectifiers attempt to conduct current at the same time.

The aforementioned and other objects and advantages of the invention and the manner of obtaining them will best be understood by reference to the following detailed description of an embodiment of an electrical control system taken in conjunction with the accompanying drawings, wherein.

Figure 1A:
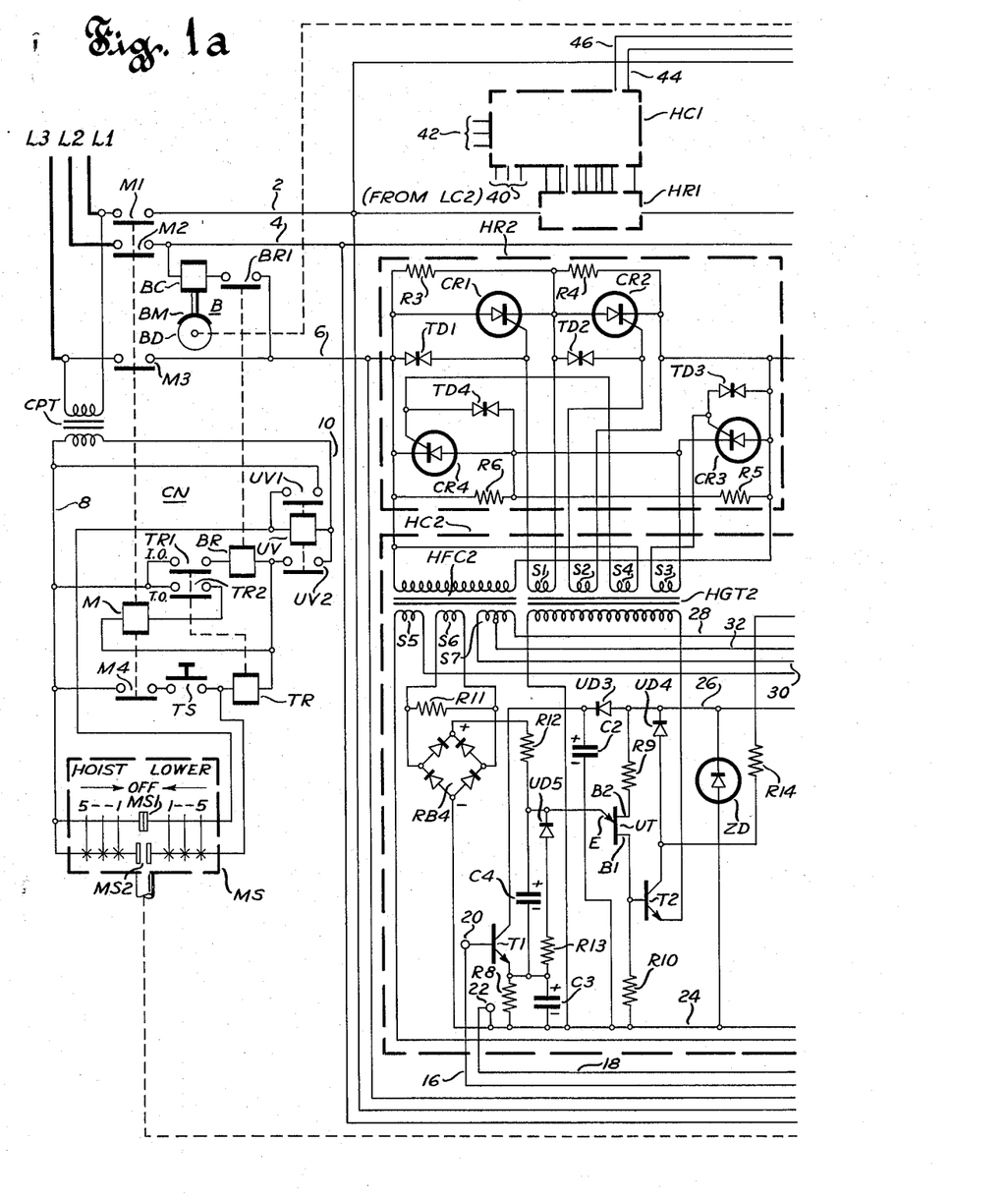
FIGS. 1a and 1b show a circuit diagram of a hoist motor control system constructed in accordance with the invention.
Figure 1B:
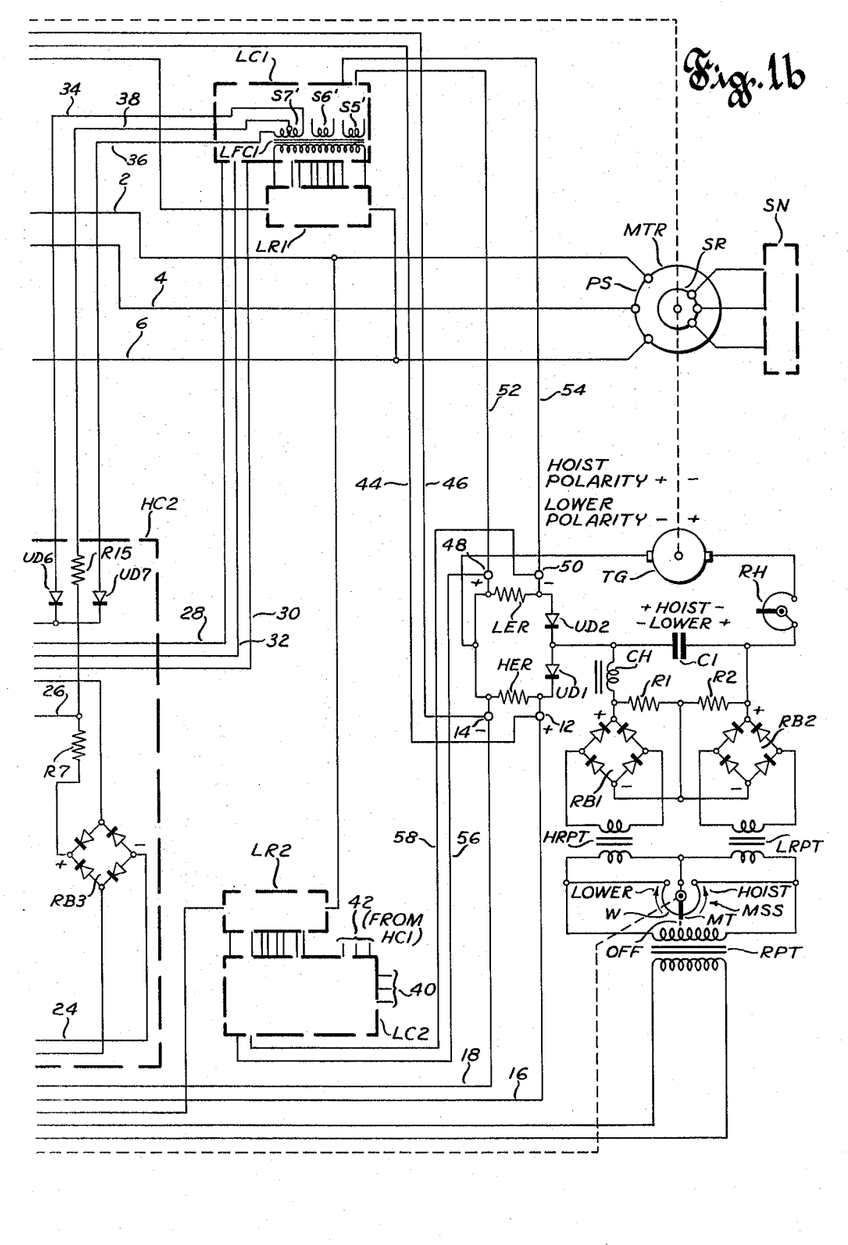

Referring to FIGS. 1a and 1b, there is shown a motor MTR of the wound-rotor, slip-ring type and a control system therefor.

Motor MTR is provided with a three-phase primary or stator winding PS and a three-phase secondary or rotor winding SR. The rotor winding is connected by three conductors to a secondary network SN of the resistance type or the like shown schematically as a rectangle. A three-phase alternating current power supply source is connectable through power supply lines L1, L2 and L3 and normally open contacts M1, M2 and M3, respectively, of a main power contactor M to conductors 2, 4 and 6, respectively. Conductor 2 is connected through a first hoisting voltage control circuit or hoisting controlled rectifier circuit HR1 to a first terminal of the primary-stator PS of the motor. Conductor 4 is connected directly to the center terminal of the primary-stator of the motor. And conductor 6 is connected through a second hoisting voltage control circuit or hoisting controlled rectifier circuit HR2 to the third terminal of the primary-stator of motor MTR. As will be apparent, circuits HR1 and HR2 control the motor primary voltage and current and motor speed in a first direction for hoisting purposes.

Means are also provided for controlling the motor primary voltage and motor speed in the reverse direction for lowering purposes. To this end, conductor 2 is connected through a first lowering voltage control circuit or lowering controlled rectifier circuit LR1 to the third terminal of the motor primary-stator winding. And conductor 6 is connected through a second lowering voltage control circuit or lowering controlled rectifier circuit LR2 to the first terminal of motor primary-stator winding PS. As will be apparent, circuits LR1 and LR2 are cross-connected between power supply lines L1 and L3 and the third and first primary-stator terminals of the motor relative to the connections of hoisting voltage control circuits HR1 and HR2 thereto. In this manner, circuits LR1 and LR2 reverse the first and third voltage phases on the motor primary winding to cause motor rotation in the reverse or lowering direction.

Lowering voltage control circuit LR2 is identical to hoisting voltage control circuit HR2 and has been shown as a rectangle to avoid complicating the drawings. Hoisting voltage control circuit HR1 and lowering voltage control circuit LR1 are also identical to circuit HR2 except that they are shown turned upside down in the drawings whereby to simplify connection thereof to their associated firing control circuits hereinafter described.

Hoisting voltage control circuit HR2 is provided with a firing control circuit HC2 for controlling firing of the forward and reversing controlled rectifiers therein. Hoisting voltage control circuit HR1 and lowering voltage control circuits LR1 and LR2 are provided with similar firing control circuits HC1, LC1 and LC2, respectively, which are shown as rectangles to avoid complicating the drawings. A showing of the details of circuits HR2 and HC2 and only the blocking control transformer connections of circuit LC1 appears to be sufficient for an understanding of the nature of and operation of the invention.

As shown in FIG. 1a, there is provided a control network CN supplied from lines L1 and L3. For this purpose, the primary winding of a control potential transformer CPT is connected across lines L1 and L3 and the secondary winding thereof is connected to conductors 8 and 10. Control network CN is provided with an undervoltage relay UV having its operating coil connected through normally closed "off" contact MS1 of a master switch MS across conductors 8 and 10. Relay UV is provided with a normally open self-maintaining contact UV1 connected across contact MS1 and a normally open contact UV2 connected as hereinafter described.

Network CN is also provided with a timing relay TR having its operating coil connected through contact UV2 and a normally open contact MS2 of master switch MS across conductors 8 and 10. Relay TR is provided with normally open contacts TR1 and TR2. Contact TR1 is of the instantaneous opening type and connects the operating coil of a brake control relay BR through contact UV2 across conductors 8 and 10. Contact TR2 is of the timed opening type (being provided with a dashpot or the like) and connects the operating coil of main contactor M through contact UV2 across conductors 8 and 10.

Brake control relay BR is provided with a normally open contact BR1 connecting the operating coil BC of a brake B across conductors 4 and 6. Brake B is also provided with a braking member or shoe BM and a brake drum BD or the like connected as shown by the broken line to the shaft of motor MTR.

Main contactor M, in addition to the aforementioned main power contacts M1, M2 and M3, is provided with a normally open contact M4 connected in series with a normally open thumb switch TS across contact MS2 of the master switch. As will be apparent, thumb switch TS may be pressed to maintain the motor connected to the power supply lines after master switch MS is turned to its "off" position. This thumb switch is preferably located on or immediately adjacent the master switch.

Master switch MS, a portion of which is shown in the lower left-hand portion of FIG. 1a, is also provided with a stepless master speed setter MSS shown in the lower portion of FIG. 1b. Master speed setter MSS is mechanically connected to master switch MS as indicated by the broken line therebetween for rotation in unison in the clockwise lowering direction or alternatively for rotation in the counterclockwise hoisting direction as indicated by the arrows and legends adjacent both switch MS and the speed setter MSS.

Under normal operating conditions, when the operator wishes to deenergize the motor and set the brake, he moves the master switch to its center "off" position. However, the operator might wish to "float" the load, that is, energize the motor for zero speed and maintain the brake disengaged. This is done by pressing the thumb switch and moving the master switch toward its "off" position. The actual master switch position for zero speed will depend on the magnitude of the load. Also, the thumb switch allows the operator to reverse motor direction without setting the brake. This affords much smoother operation.

As will hereinafter appear, master speed setter MSS affords a speed reference signal or a desired speed signal which is compared with an actual speed signal to provide an error signal which is then used to control the motor primary voltage to bring the actual speed to the desired speed. To this end, the primary winding of a reference potential transformer RPT is connected across conductors 2 and 4 whereby it is energized from lines L1 and L2 when main contactor M is energized. The secondary winding of transformer RPT is connected across the voltage producing member of master speed setter MSS.

This speed setter is of the voltage divider type having a member across which a voltage is produced and which is traversed by a movable tap to divide the voltage thereacross into two output voltages in any desired ratio. While speed setters suitable for use herein may taken various forms, speed setter MSS is preferably of the autotransformer type having a winding W connected across the secondary winding of transformer RPT and a movable tap MT.

Movable tap MT is connected through the primary winding of a hoist reference potential transformer HRPT to one end of speed setter winding W and is connected through the primary winding of a lower reference potential transformer LRPT to the other end thereof. The secondary windings of transformers HRPT and LRPT are connected to the respective input terminals of full-wave rectifier bridges RB1 and RB2. The positive output terminal of bridge RB1 is connected to the positive output terminal of bridge RB2 through voltage comparing resistors R1 and R2 in series, the junction of resistors R1 and R2 being connected to the negative output terminals of both bridges RB1 and RB2.

An alternating current choke CH of the iron core inductance coil type and a capacitor C1 are connected in series across resistors R1 and R2. The function of choke CH is to impose a high impedance to flow of alternating current and thereby effectively to block the latter from the direct current circuit in parallel with capacitor C1. The junction of choke CH and capacitor C1 is connected through a unidirectionally conducting diode UD1 and a "hoist" error resistor HER to one side of the armature winding of a tachometer generator TG. The other side of the armature winding of the tachometer generator is connected through a gain-adjusting rheostat RH of the adjustable resistance type to the other side of capacitor C1. Tachometer generator TG is coupled to the shaft of motor MTR as indicated by the broken line for rotation in unison therewith. Generator TG is provided with a suitable field winding which is known and not shown and generates a unidirectional voltage having a magnitude proportional to the speed of motor MTR and a polarity according to the direction of rotation of the motor. A "lower" error resistor LER and a undirectionally conducting diode UD2 are connected in series between the armature winding of generator TG and capacitor C1 to provide a path for current flow in the other direction in shunt of resistor HER and diode UD1.

Hoisting voltage control circuit HR2 comprises a pair of controlled rectifiers CR1 and CR2 connected in series for conducting current in the direction from line L3 to the third terminal of primary-stator winding PS of the motor and a pair of controlled rectifiers CR3 and CR4 connected in series for conducting current in the opposite direction in shunt of controlled rectifiers CR1 and CR2. These controlled rectifiers are preferably of a semiconductor or silicon type having an anode and a cathode forming a main current conduction path and a gate which may be controlled to fire the controlled rectifier, that is, to render the same conducting from anode to cathode. These controlled rectifiers continue to conduct after firing for the remainder of the half-cylce of the supply voltage.

Resistors R3 and R4 are connected across controlled rectifiers CR1 and CR2, respectively, and resistors R5 and R6 are connected across controlled rectifiers CR3 and CR4, respectively. The function of these pairs of resistors is to afford proper division of reverse voltage across the controlled rectifiers of the respective pairs thereof. For this purpose, the resistors of each such pair thereof are preferably given resistance values proportional to the peak inverse voltage ratings of the respectively associated controlled rectifiers. As a result, these resistors prevent application of unbalanced or excessive reverse voltage on a single controlled rectifier which, if permitted, might cause voltage failure thereof. Control circuit HC2 is connected to the gate-cathode junctions of controlled rectifiers CR1–4 as hereinafter described for applying firing voltage pulses thereto. Overvoltage protective devices of the semi-conductor type such as "thyrector" diodes TD1, TD2, TD3 and TD4 are connected to the anode-gate junctions of controlled rectifiers CR1–4, respectively, to afford protection against excessive anode voltage or anode voltage firing, that is, firing of the controlled rectifier by anode voltage alone without gate voltage being applied if the anode voltage becomes excessive due to transient voltage peaks or the like.

Control circuit HC2 is provided with means for applying firing voltage pulses to the gate-cathode junctions of the controlled rectifiers in circuit HR2 to control conduction of these controlled rectifiers. These means comprise a "hoist" gate firing transformer HGT2 having a primary winding energized as hereinafter described and four secondary windings S1, S2, S3 and S4 connected across the the gate-cathode junctions of the controlled rectifiers CR1–4, respectively. Control circuit HC2 is provided with a transistor T1 of the N–P–N conductivity type controlled by a hoist error signal. To this end, a pair of hoist error signal terminals 12 and 14 are connected to resistor HER, positive terminal 12 being connected to the junction of resistor HER and cathode of diode UD1 and negative terminal 14 being connected to the other end of resistor HER. Terminals 12 and 14 are connected through conductors 16 and 18 to error signal input terminals 20 and 22 of circuit HC2. Terminal 20 is connected to the base of transistor T1 and terminal 22 is connected to common conductor 24.

Supply voltage is applied to transistor T1 from a hoist firing control transformer HFC2 having its primary winding connected across second hoist controlled rectifier HR2. That is, the primary winding of transformer HFC2 is connected across the pairs of controlled rectifiers CR1–2 and CR3–4 so that a voltage proportional to the voltage appearing across each such pair of controlled rectifiers is applied to this primary winding. Transformer HFC2 is provided with three secondary windings S5, S6 and S7. Secondary winding S5 is connected to the input terminals of a full-wave rectifier bridge RB3. The positive output terminal of bridge RB3 is connected through a resistor R7, conductor 26 and a unidirectionally conducting diode UD3 to the collector of transistor T1. The emitter of transistor T1 is connected through a load or emitter resistor R8 and conductor 24 to the negative output terminal of bridge RB3. A smoothing capacitor C2 is connected between the collector of transistor T1 and conductor 24 to smooth the voltage applied across transistor T1 and resistor R8.

Transistor T1 functions as an amplifier in response to an input signal voltage at input terminals 20 and 22 to control charging of a capacitor C3 connected across resistor R8. The voltage on capacitor C3 which is proportional to the aforementioned hoist error voltage appearing across resistor HER constitutes a first component of a control voltage which is employed to control firing of controlled rectifiers CR1–4 as hereinafter more fully described.

The firing control circuit for the aforementioned controlled rectifiers comprises an amplifier for energizing the primary winding of transformer HGT2. This amplifier comprises a transistor T2 of the N–P–N conductivity type having its emitter connected through the primary winding of transformer HGT2 to common negative conductor 24. Supply voltage is applied to the collector of transistor T2 from positive conductor 26 through a unidirectionally conducting diode UD4 in its reverse or high impedance direction.

Transistor T2 is controlled by a unijunction transistor UT. Interbase voltage to unijunction transistor UT is supplied from conductor 26 through a resistor R9 to base B2 while base B1 thereof is connected through a load resistor R10 to conductor 24. The junction of base B1 and resistor R10 is connected to the base of transistor T2. The voltage across conductors 26 and 24 is limited by a breakover diode ZD of the zener type or the like whereby the amplitude of the voltage supplied to the transistor T1, T2 and UT will not exceed the breakover voltage of diode ZD.

Means are provided to develop a second component of voltage which is added to the voltage component appearing across capacitor C3 to control initiation of conduction in unijunction transistor UT. This means comprises a capacitor C4 and control means therefor. A voltage proportional to the integrated volt-seconds appearing across the series-connected controlled rectifiers in circuit HR2 is applied from secondary winding S6 of transformer HFC2 to the input terminals of a full-wave rectifier bridge RB4, there being a resistor R11 connected across secondary winding S6 providing a shunt path for current flow when capacitor C4 charges. The positive output terminal of bridge RB4 is connected through a resistor R12 and capacitor C4 and then in parallel through resistor R8 and capacitor C3 to conductor 24, the latter being connected directly to the negative output terminal of bridge RB4. The junction of resistor R12 and capacitor C4 is connected directly to emitter E of unijunction transistor UT. A resistor R13 and a unidirectionally conducting diode UD5 are connected in series from the junction of capacitors C3 and C4 across capacitor C4 to the other side thereof. This unidirectional circuit across capacitor C4 prevents the latter from charging in the reverse direction as hereinafter more fully described.

Secondary winding S7 of transformer HFC2 is provided for the purpose of supplying an unblocking voltage to lowering firing control circuit LC1. Secondary winding S7 may be of the center tap type and three conductors 28, 30 and 32 from the opposite ends and from the center tap thereof extend to lowering firing control circuit LC1. This unblocking voltage is applied to circuit LC1 in the same manner hereinafter described for applying an unblocking voltage from circuit LC1 to circuit HC2. These unblocking voltages must be cross-connected between those firing control circuits which control controlled rectifiers connected to the same motor conductor. That is, controlled rectifier circuits HR2 and LR1 are both connected to the third motor primary-stator terminal and, therefore, firing control circuits HC2 and LC1 associated therewith are cross-connected to supply unblocking voltages to one another. In this connection, it will be noted that circuit LC1 is provided with a lower firing control transformer LFC1 similar to transformer HFC2 in circuit HC2. The primary winding of transformer LFC1 is connected across the series controlled rectifiers in circuit LR1. Secondary windings S5' and S6' are equivalent to and serve similar purposes in circuit LC1 as secondary windings S5 and S6 serve in circuit HC2. Secondary windings S7' may be provided with a center tap similar to winding S7 in circuit HC2. Conductors 34, 36 and 38 extend from the opposite ends of and from the center tap of secondary windings S7' to circuit HC2. Conductors 34 and 36 are connected through unidirectionally conducting rectifier diodes UD6 and UD7, respectively, and then through a resistor R14 to the anode of diode UD4. Conductor 38 is connected through a resistor R15 to conductor 26 and through the latter to the cathode of diode UD4.

As will be apparent from the foregoing, circuit LC1 supplies a voltage through conductors 34, 36 and 38 to control operation of circuit HC2 and the latter circuit supplies a voltage through conductors 28, 30 and 32 to control operation of circuit LC1. In a similar manner, circuits HC1 and LC2 are cross-connected to supply unblocking voltages to one another. That is, circuit LC2 supplies a voltage through conductors 40 to circuit HC1 and the latter circuit supplies a voltage through conductors 42 to circuit LC2.

Since hoist firing control circuit HC1 is like hoist firing control circuit HC2, the error voltage appearing at terminals 12 and 14 is also applied through conductors 44 and 46 to similar input terminals of circuit HC1. Lowering error voltage terminals 48 and 50 are connected to resistor LER, positive terminal 48 being connected to the junction between the armature winding of tachometer generator TG and resistor LER and terminal 50 being connected to the other end of resistor LER. Terminals 48 and 50 are connected through conductors 52 and 54 to supply an error voltage to the input terminals of "lower" firing control circuit LC1. Terminals 48 and 50 are also connected through conductors 56 and 58 to supply an error voltage to the input terminals of "lower" firing control circuit LC2.

The operation of the system of FIGS. 1a and 1b will now be described.

Application of supply power to supply lines L1, L2 and L3 causes energization of control network CN through transformer CPT. Assuming that master switch MS is in its "off" position, current flows from conductor 8 through contacts MS1 and the operating coil of undervoltage relay UV to conductor 10. This causes energization of the undervoltage relay and closure of its contact UV1 to maintain energization of its operating coil in shunt of the master switch. Undervoltage relay UV closes its contact UV2 to complete a point in the energizing circuit of the operating coil of timing relay TR.

The system is now in readiness for either a hoisting or a lowering operation. Movement of master switch MS in its "hoist" direction causes opening of contact MS1 without effect and causes closure of contact MS2 to complete an energizing circuit to the operating coil of relay TR through contact UV2 of undervoltage relay UV across conductors 8 and 10. Relay TR closes its contact TR1 to energize the operating coil of braking relay BR in a circuit extending from conductor 8 through contact TR1, the operating coil of relay BR and contact UV2 to conductor 10. Relay TR also closes its contact TR2 to complete an energizing circuit for the operating coil of main contactor M in a circuit extending from conductor 8 through contact TR2, the operating coil of contactor M and contact UV2 of under-voltage relay UV to conductor 10. Main contactor M closes its contacts M1, M2 and M3 to connect power supply lines L1, L2 and L3 to conductors 2, 4 and 6, respectively. As a result, supply voltage is applied to hoist control circuits HR1 and HR2 so that when the controlled rectifiers therein are fired, motor MTR is energized to cause rotation thereof in the hoisting direction. Supply voltage is also applied to lowering control circuits LR1 and LR2. However, the lowering control circuits will remain ineffective because the master switch has been turned in the hoisting direction.

The aforementioned energization of the operating coil of main contactor M also causes closure of its contact M4 to close a point in a bypass circuit to the operating coil of timing relay TR in shunt of master switch MS.

Since master speed setter MSS in the lower right-hand portion of FIG. 1b is mechanically connected to master switch MS as shown by the broken line, the aforementioned turning of the master switch in the hoist direction also causes movement of movable tap MT of the master speed setter from its center "off" position in the counterclockwise direction along winding W. This adjustment of the master speed setter causes an error voltage to be developed to effect operation of the motor as hereinafter described. The aforementioned closure of the contacts of main contactor M causes energization of the primary winding of transformer RPT across conductors 2 and 4. As a result, alternating current flows in the secondary winding of transformer RPT and in winding W of master speed setter MSS. The voltage appearing across the left-hand portion of winding W of master speed setter MSS causes alternating current to flow in the primary winding of hoist reference power transformer HRPT. As a result, current flows from the secondary winding of transformer HRPT to the input terminals of rectifier bridge RB1. Current also flows from the positive output terminal of bridge RB1 through resistor R1 to negative output terminal of the bridge. The voltage appearing across the right-hand portion of winding W of master speed setter MSS causes current flow in the primary winding of "lower" reference power transformer LRPT. This causes current flow in the secondary winding of transformer LRPT and therefrom to the input terminals of rectifier bridge RB2. As a result, unidirectional current flows from the positive output terminal of rectifier bridge RB2 through resistor R2 to the negative output terminal of the bridge. It will be apparent from the foregoing that the voltage drops across resistors R1 and R2 are of opposite polarity and oppose one another. When movable tap MT of master switch MSS is in its center "off" position, the voltages appearing across resistors R1 and R2 are substantially equal and opposite, so that no voltage is applied across capcitor C1.

However, when master switch MSS is turned in the counterclockwise direction as aforementioned it will be apparent that the voltage appearing across resistor R1 is of larger magnitude than the voltage appearing across resistor R2. As a result current flows through choke CH to charge capacitor C1 to the hoist polarity as indicated adjacent this capacitor. The voltage across capacitor C1 causes current flow in a circuit extending through diode UD1, resistor HER, the armature winding of tachometer generator TG and rheostat RH. The magnitude of this current flow may be adjusted at rheostat RH so that a suitable voltage drop appears across hoist error resistor HER. This hoist error voltage is applied from terminals 12 and 14 through conductors 16 and 18 to input terminals 20 and 22 of hoist firing control circuit HC2.

In a similar manner the aforementioned hoist error voltage is applied from terminals 12 and 14 through conductors 44 and 46 to the input terminals of hoist firing control circuit HC1.

Since the controlled rectifiers CR1–4 in hoist voltage control circuit HR2 are not conducting, it will be apparent that the full supply voltage appears thereacross. This supply voltage causes energization of the primary winding of hoist firing control transformer HFC2 which is connected across circuit HR2. As a result voltage is applied from secondary winding S5 to the input terminals of rectifier bridge RB3. As a result, current flows from the positive output terminal of rectifier bridge RB3 through resistor R7, conductor 26, diode UD3, capacitor C2 and conductor 24 to the negative output terminal of bridge RB3 to charge capacitor C2. The voltage appearing across capacitor C2 supplies the collector-emitter junction of transistor T1. The voltage appearing at the positive and negative output terminals of rectifier bridge RB3 is sufficient to cause zener diode ZD to break over. As a result, current flows from the positive output terminal of bridge RB3 through resistor R7, conductor 26, zener diode ZD and conductor 24 to the negative output terminal of bridge RB3. The function of zener diode ZD is to limit the unidirectional voltage appearing across conductors 26 and 24. This voltage appearing across conductors 26 and 24 supplies the interbase voltage for unijunction transistor UT.

The aforementioned voltage appearing across conductors 26 and 24 also supplies collector-emitter voltage for transistor T2. However, unidirectional diode UD4 prevents current flow from conductor 26 toward the collector of transistor T2 until diode UD4 is "unblocked" as hereinafter described.

It will be apparent that supply voltage is also applied across lowering control circuits LR1 and LR2 and across the controlled rectifiers therein. Since the controlled rectifiers in these circuits are not in their conducting condition, the full supply voltage appears across each of these circuits. So long as the controlled rectifiers in circuit LR1 are not conducting, the primary winding of lower firing control transformer LFC1 is energized. As a result current flows in the secondary winding S7' of transformer LFC1. On the first half cycle of the supply voltage, current flows from the right-hand end of secondary winding S7' through conductor 34, diode UD6, resistor R14, diode UD4, conductor 26, resistor R15 and conductor 38 to the center tap of secondary winding S7'. On each alternate half cycle of the supply voltage, current flows from the left-hand end of secondary winding S7' through conductor 36, diode UD7, resistor R14, diode UD4, conductor 26, resistor R15 and conductor 38 to the center tap of the secondary winding. As a result full-wave rectified current flows through diode UD4 in its low impedance, anode-cathode direction. This current flow through diode UD4 causes this diode to be "unblocked" whereby transistor T2 can be rendered conducting as hereinafter more fully described.

In a similar manner, so long as the controlled rectifiers in circuit LR2 are not conducting, the full supply voltage appears across these controlled rectifiers to cause current flow from lower firing control circuit LC2 through the three conductors 40 to hoist firing control circuit HC1 to cause unblocking of a similar unidirectional diode therein, this diode being similar to diode UD4 in circuit HC2. In like manner, so long as the controlled rectifiers in circuit HR1 are not conducting, current flows from circuit HC1 through conductors 42 to circuit LC2 to cause unblocking of the latter. In like manner the aforementioned energization of the primary winding of transformer HFC2 in hoist firing control circuit HC2 causes current to flow through conductors 28, 30 and 32 to cause unblocking of lower firing control circuit LC1.

The aforementioned energization of the primary winding of transformer HFC2 causes current to flow from secondary winding S6 thereof to the input terminals of the rectifier bridge RB4. On each half cycle of the rectified supply voltage, current flows from the positive output terminal of bridge RB4 through resistor R12 and capacitor C4 and then through resistor R8 and conductor 24 to the negative output terminal of bridge RB4. This current flow causes capacitor C4 to be charged on each half-cycle of the supply voltage so that a voltage appears across this capacitor in the direction indicated by the positive and negative symbols thereat.

Application of the aforementioned hoist error signal voltage to input terminals 20 and 22 causes the base of transistor T1 to be rendered positive voltage relative to the emitter thereof. As a result, transistor T1 is rendered conducting and the voltage appearing across capacitor C2 causes current flow through the collector-emitter junction of transistor T1 and therough capacitor C3 to charge the latter. When capacitor C3 becomes charged, the current flowing through transistor T1 is diverted through resistor R8 whereby capacitor C3 remains charged to a value proportional to the voltage drop appearing across resistor R8. The voltage appearing across capacitor C3 has a magnitude which is proportional to the magnitude of the hoist error signal voltage appearing across resistor HER. This voltage appearing across capacitor C3 constitutes a first voltage component for controlling unijunction transistor UT. Since the voltage appearing across capacitor C3 is proportional to the hoist error voltage its magnitude may be adjusted by turning master speed setter MSS.

The second component of voltage for controlling unijunction transistor UT is the voltage appearing across capacitor C4. The voltage appearing across capacitor C4 on each half cycle of the supply voltage has a magnitude which is proportional to the integrated volt-seconds, or integral of the voltage relative to the time of one-half cycle, appearing across these series connected controlled rectifiers in circuit HR2. The RC circuit comprising resistor R12 and capacitor C4 has a long time constant relative to one-half cycle of the supply voltage. The value of resistor R12 is preferably selected so that the voltage across capacitor C4 will reach a value at the end of each half cycle sufficient to fire unijunction transistor UT in the absence of an error input signal. Since the voltage across capacitor C4 reaches a magnitude sufficient to fire unijunction transistor UT at the end of each half cycle of the supply voltage, it will be apparent that any voltage on capacitor C3 due to an error input signal will proportionally advance on each half-cycle the point at which unijunction transistor UT is rendered conducting. The function of capacitor C2 is to smooth the rectified half-cycles applied to transistor T1. As a result, a constant hoist error input signal applied to input terminals 20 and 22 maintains a constant voltage across capacitor C3. Decrease in the magnitude of the input signal decreases the voltage across capacitor C3 and increase in the input signal magnitude correspondingly increases the voltage appearing across capacitor C3.

The function of unidirectional diode UD3 is to act as a blocking diode whereby capacitor C2 is prevented from smoothing or affecting the voltage appearing across conductors 26 and 24. As a result of diode UD3, synchronous half-cycle pulses are applied to transistor T2 and unijunction transistor UT whereas a smoother D.C. voltage is applied to transistor T1.

When the sum of the voltages on capacitor C3 and C4 reaches a predetermined value unijunction transistor UT fires. As a result, current flows from the positive side of capacitor C4 through emitter E and base B1 of unijunction transistor UT, resistor R10, conductor 24 and resistor R8 to the negative side of capacitor C4. The voltage drop across resistor R10 is applied to the base-emitter junction of transistor T2 to render transistor T2 conducting.

During each half-cycle of the supply voltage, rectified current flows from the positive output terminals of rectifier bridge RB3, resistor R7, conductor 26, diode ZD and conductor 24 to the negative output terminal of bridge RB3. As a result of this current flow, diode ZD limits the magnitude of the half-cycle voltage pulses appearing across conductors 26 and 24. These voltage pulses are applied through resistors R9 and R10 across base B2 and base B1 of unijunction transistor UT to afford interbase supply voltage therefor which decreases to zero value at the end of each half-cycle. These voltage pulses are also applied to the circuit including diode UD4, transistor T2 and the primary winding of hoist gating transformer HGT2 in series connection. Since these voltage pulses are applied to diode UD4 in its high impedance, cathode-to-anode direction, this diode will block or prevent current flow through transistor T2 to the load device, that is to the primary winding of transformer HGT2 except as hereinafter described.

The aforementioned current flow from lower firing control circuit LC1 and conductors 34, 36 and 38 through diode UD4 in its anode-to-cathode or forward direction causes this diode to appear as a low impedance in its reverse or cathode-to-anode direction. The effective result is that the voltage appearing across conductors 26 and 24 causes current to flow through diode UD4, the connector-emitter junction when transistor T2 is rendered conducting as aforesaid and through the primary winding of transformer HGT2. The current flow through diode UD4 in its forward direction due to the voltage on secondary winding S7' of transformer LFC1 must be of greater magnitude than the current flow through transistor T2 and the primary winding of transformer HGT2 due to the voltage across conductors 26 and 24 in order to prevent diode UD4 from blocking such current flow through transistor T2. Energization of transformer HGT2 as aforesaid causes firing voltages to be applied from secondary windings S1, S2, S3 and S4 thereof to the gate-cathode junctions of controlled rectifiers CR1, CR2, CR3 and CR4, respectively. Assuming that line L3 is positive relative to line L1 at this time, current flows from line L3 through contact M3, conductor 6, controlled rectifiers CR1 and CR2 and from the third terminal through the motor primary winding to the first terminal thereof.

At the same time, an error voltage is applied through conductors 44 and 46 to circuit HC1 and an unblocking voltage is applied from circuit LC2 through conductors 40 to circuit HC1 whereby the controlled rectifiers in circuit HR1 are fired in a similar manner. As a result, the current flows from the first primary terminal of the motor back through circuit HR1, conductor 2 and contact M1 to line L1. When line L2 becomes negative relative to line L3, current flows from line L3 through contact M3, conductor 6, circuit HR2, the third terminal and the primary winding and the second terminal of motor MTR, conductor 4 and contact M2 to line L2. During the other phases of the supply voltage, current flows from line L1 to lines L2 and L3 and from L2 to lines L3 and L1 to energize the motor primary winding for hoisting the load.

When the motor accelerates, it rotates tachometer generator TG whereby a voltage is applied from the generator armature winding to oppose the voltage appearing across capacitor C1. This generator voltage is subtracted from the reference voltage and the difference constitutes the error voltage which is applied through conductors 16, 18 and 44, 46 to the input terminals of hoist firing control circuits HC1 and HC2 to control the firing angle of the hoist controlled rectifiers. The reference voltage will be larger than the feedback voltage from the tachometer generator whereby a constant error input voltage is derived to control the firing angle of the controlled rectifiers.

It will be apparent that, if for some reason, the lowering controlled rectifiers attempt to conduct or do conduct current when the hoisting controlled rectifiers are being fired, the power supply lines might be short circuited. For example, such condition might cause a short circuit from line L3 through contact M3, conductor 6, circuit HR2, circuit LR1, conductor 2 and contact M1 to line L1. Means are provided to prevent line-to-line short circuits of this type. This means comprises the diodes UD4 and cross-connected voltages between circuits HC2 and LC1 and between circuits HC1 and LC2. For example, if the controlled rectifiers in lowering circuit LR1 conduct then the controlled rectifiers in circuit HR2 cannot be fired. If the controlled rectifiers in circuit LR1 conduit, the voltage thereacross decreases to zero to deenergize the primary winding of transformer LFC1. Consequently, no unblocking current flows through diode UD4 in the anode-to-cathode or forward direction. As a result, diode UD4 prevents current flow from conductor 26 through transistor T2 and the primary winding of transformer HGT2. While there is a circuit in shunt of diode UD4 extending through resistor R15, conductor 38, transformer secondary winding S7', conductors 34 and 36, diodes UD6 and UD7 and resistor R14, the impedance of this circuit is so high that sufficient current cannot flow therethrough when secondary winding S7' is deenergized to cause firing of controlled rectifiers CR1–4.

When master speed setter MSS is turned in the clockwise lower direction from its off position, an error voltage will be developed across resistor LER and applied through conductors 52 and 54 to lowering control circuit LC1 and through conductors 56 and 58 to lowering control circuit LC2 to cause the motor to operate in the reverse or lowering direction in a manner similar to that hereinbefore described. Operation of controlled rectifier circuits LR1 and LR2 causes reversal of two of the phases to cause reversal of motor rotation.

An advantage in addition to those hereinbefore described is a decrease in the torque loss over magnetic amplifier motor control systems and the like. Since the forward voltage drop of a controlled rectifier is very small of the order of one volt, the torque loss resulting from primary reactor voltage drop in such magnetic amplifier systems is substantially eliminated in this invention.

Thyrector diodes TD1–4 are connected between the anodes and gates of controlled rectifiers CR1–4, respectively, to afford protection against excessive anode voltage thereon or anode voltage firing, that is, firing of the controlled rectifiers by anode voltage without application of gate voltage. As will be apparent, excessive anode voltage will cause current flow through the thyrector diode. This current will flow into the gate and will fire the controlled rectifier. Such gate firing prevents damage to the controlled rectifier which might be caused by anode firing under excessive anode voltage. By connecting these diodes between the anodes and gates of the controlled rectifiers, smaller current devices such as these thyrector diodes can be used and protective devices capable of carrying the entire load current are not required.

When controlled rectifiers CR1 and CR2 are fired as aforementioned, they continue to conduct for the remainder of the half-cycle of the supply voltage. In view of this, the motor energization can be increased or decreased by advancing or retarding the point on each half-cycle of supply voltage at which the controlled rectifiers are fired. As will be apparent, this is done by adjusting master speed setter MSS.

When controlled rectifiers CR1 and CR2 are fired, the voltage thereacross decreases to a very small value substantially to deenergize transformer HFC2. Smoothing capacitor C2 maintains a supply voltage on transistor T1 thereby to maintain a charge on capacitor C3. Since the interbase voltage of unijunction transistor UT is supplied from across the controlled rectifier, this interbase voltage decreases to near zero value when the controlled rectifiers are fired. The unijunction transistor UT has a characteristic whereby the emitter-base B1 voltage required to maintain current conduction therethrough is directly proportional to the interbase voltage. Consequently, decrease in the interbase voltage allows this unijunction transistor to continue conducting at a lower emitter-base B1 voltage. As a result, the unijunction transistor conducts until capacitor C4 is completely discharged. Any tendency on the part of capacitor C4 to charge in the reverse direction will be prevented by diode UD5 and resistor R13. Thus, if the voltage on capacitor C3 tends to charge capacitor C4 in the reverse direction after each discharge thereof, such charge would leak off through resistor R13 and diode UD5. In this manner, capacitor C4 is completely discharged and will recharge on the next half-cycle to a voltage magnitude which is the integral relative to time of the voltage appearing across the controlled rectifiers associated therewith. This integrated voltage on capacitor C4 for controlling the firing angle of the controlled rectifiers is desirable to afford a linear input voltage to output voltage relationship for the system regardless of the wave form of the supply source. Use of the integrated voltage on capacitor C4 added to the adjustable voltage on capacitor C3 which is directly proportional to the error signal affords linear input to output control which is steplessly adjustable.

While the system hereinbefore described is effectively adapted to fulfill the objects stated, it is to be understood that I do not intend to confine my invention to the particular preferred embodiment of electrical control system disclosed, inasmuch as it is susceptible of various modifications without departing from the scope of the appended claims.

I claim:
1. A system for controlling energization of a three-phase alternating current load device and having three input terminals for applying electrical power thereto comprising:
 (a) a three-phase alternating current power supply source;
 (b) three supply conductors connected to said source;
 (c) means for connecting a first one of said supply conductors directly to a first one of said three input terminals;
 (d) first controlled rectifier means interposed and connected between the second supply conductor and the second input terminal and second controlled rectifier means interposed and connected between the third supply conductor and the third input terminal, each of said controlled rectifier means comprising at least two solid state controlled rectifiers connected in reverse parallel relation to afford current flow in opposite directions through the respective controlled rectifiers between the associated supply conductor and the associated input terminal;
 (e) means for controlling firing of said controlled rectifiers during positive half-cycles of their anode voltage to energize the load device;
 (f) third controlled rectifier means interposed and connected between said second supply conductor and said third input terminal and fourth controlled rectifier means interposed and connected between said third supply conductor and said second input terminal, each said third and fourth controlled rectifier means comprising at least two solid state controlled rectifiers connected in reverse parallel relation to afford current flow in opposite directions through the respective controlled rectifiers between the associated supply conductor and the associated input terminal;
 (g) and means for controlling firing of said controlled rectifiers in said third and fourth controlled rectifier means during positive half-cycles of their anode voltage to energize the load device with reversal of two phases of the three-phase voltage supplied thereto.

2. In a system for controlling energization of a three-phase alternating current load device having three input terminals for receiving electrical power from a three-phase alternating current source, the improvement comprising:
 (a) three supply conductors connected to said source;
 (b) means for connecting a first one of said supply conductors directly to a first one of said three input terminals;
 (c) first current conduction control means connected between said second supply conductor and said second input terminal;
 (d) second current conduction control means connected between said third supply conductor and said third input terminal;
 (e) third current conduction control means connected between said second supply conductor and said third input terminal;
 (f) fourth current conduction control means connected between said third supply conductor and said second input terminal;
 (g) each said current conduction control means comprising at least two solid state controllable rectifiers connected in reverse parallel relation to afford current flow in opposite directions through the respective controllable rectifiers between the associated supply conductor and the associated input terminal;
 (h) firing control means for each of said current conduction control means for controlling firing of the controllable rectifiers therein during positive half-cycles of their anode voltage;
 (i) means for selectively operating the firing control means of said first and second current conduction control means to apply power from the second supply conductor to the second input terminal and from the third supply conductor to the third input terminal or for alternatively operating the firing control means of said third and fourth current conduction control means to apply power from the second supply conductor to the third input terminal and from the third supply conductor to the second input terminal to energize the load with reversal of two phases of the three-phase voltage;
 (j) and means for preventing short circuits between said second and third supply conductors in shunt of said load device comprising:
 (k) means in each of said firing control means for preventing firing of the controllable rectifiers associated therewith if the controllable rectifiers connected to the same input terminal should conduct;
 (l) and means effective when said controllable rectifiers connected to the same input do not conduct for rendering said preventing means ineffective thereby to afford firing of the controllable rectifiers so associated.

3. A system for controlling energization of a three-phase alternating current load device and having three input terminals for applying electrical power thereto comprising:
 (a) a three-phase alternating current power supply source;
 (b) three supply conductors connected to said source;
 (c) means for connecting a first one of said supply conductors directly to a first one of said three input terminals;
 (d) first controlled rectifier means interposed and connected between the second supply conductor and the second input terminal and second controlled rectifier means interposed and connected between the third supply conductor and the third input terminal, each said controlled rectifier means comprising at least two solid state controlled rectifiers connected in reverse parallel relation to afford current flow in opposite directions through the respective controlled rectifiers between the associated supply conductor and the associated input terminal;
 (e) means for controlling firing of said controlled rectifiers during positive half-cycles of their anode voltage to energize the load device;
 (f) an input voltage source;
 (g) means responsive to said input voltage for developing a first control voltage component proportional thereto;
 (h) means for developing a second control voltage component proportional to the integrated volt-seconds appearing across the associated controlled rectifiers to be fired;
 (i) and means responsive to the sum of the first and second control voltage components when it reaches a predetermined magnitude for firing said controlled rectifiers.

4. The invention defined in claim 3, wherein said input voltage source comprises:
  (a) means for selectively adjusting the magnitude of said input voltage thereby proportionally to adjust the magnitude of said first control voltage component whereby increase in the input voltage advances the point on each half-cycle of the supply voltage at which the controlled rectifiers are fired and decrease in the input voltage retards the point on each half-cycle of the supply voltage at which the controlled rectifiers are fired.

5. The invention defined in claim 3, wherein said means for developing a first control voltage component comprises:
  (a) a controllable semi-conductor device controlled by said input voltage;
  (b) and a capacitor connected to said semi-conductor device for receiving a charge and for developing a voltage proportional to said input voltage.

6. The invention defined in claim 5, wherein said means for developing a second control voltage component comprises:
  (a) a resistor and a second capacitor in series connection with the first mentioned capacitor;
  (b) and rectifier means for receiving a voltage from across the associated controlled rectifiers and charging said second capacitor through said resistor on each half-cycle of the supply voltage whereby the series connection of said capacitors affords a voltage equal to the sum of the voltages on said capacitors.

7. The invention defined in claim 6, wherein said means responsive to the sum of the first and second control voltage components comprises:
  (a) a first semi-conductor device operative when rendered conducting for discharging said second capacitor;
  (b) a second semi-conductor device for controlling a firing transformer whereby to apply firing voltages to the gates of the associated controlled rectifiers;
  (c) and means responsive to the discharge current of said second capacitor flowing through said first semi-conductor device for rendering said second semi-conductor device conducting.

8. A control system for a three-phase alternating current motor having primary and secondary windings and three terminals on the primary windings, said control system comprising:
  (a) a three-phase alternating current power supply source;
  (b) three supply conductors connected to said source;
  (c) means for connecting one supply conductor directly to one terminal on the motor primary winding;
  (d) a first pair of controlled rectifier circuits connected between the other two supply conductors and the other two motor primary terminals, respectively;
  (e) first means for controlling the firing angle of the controlled rectifiers in said first pair of circuits to energize the motor for rotation in a first direction;
  (f) a second pair of controlled rectifier circuits cross-connected between said other two supply conductors and said other two motor primary terminals;
  (g) and second means for controlling the firing angle of the controlled rectifiers in said second pair of circuits to energize the motor for rotation in the opposite direction.

9. The invention defined in claim 8, wherein each said first and second firing control means comprises:
  (a) means responsive to motor rotation for developing a signal proportional to the actual speed of the motor;
  (b) adjustable means for developing a signal proportional to the desired speed of the motor;
  (c) means for comparing said actual speed signal and said desired speed signal to develop an error signal;
  (d) and means responsive to said error signal for operating the associated firing angle control means.

10. The invention defined in claim 8, together with:
  (a) means for preventing short circuits between said other two supply conductors comprising means for preventing firing of the controlled rectifiers in any one of said controlled rectifier circuits if the controlled rectifiers in the controlled rectifier circuit which is connected to the same motor terminal are then conducting current.

11. The invention defined in claim 10, wherein said means for preventing firing comprises:
  (a) a blocking device for each controlled rectifier circircuit for preventing application of firing voltage to the latter;
  (b) and means for applying an unblocking voltage from across each controlled rectifier circuit to the blocking device associated with the controlled rectifier circuit which is connected to the same motor terminal to unblock the same and to allow firing of the controlled rectifiers therein whereby conduction of the controlled rectifiers in any controlled rectifier circuit causes said unblocking voltage to decrease substantially to zero value and thereby to render the blocking device to which it is connected effective to prevent firing of the associated controlled rectifiers.

12. A system for controlling forward energization of the primary winding of a three-phase alternating current motor and for controlling reverse energization of such primary winding by reversal of two phases of the three-phase supply source whereby to hoist and lower a load comprising:
  (a) three supply conductors connected to said source;
  (b) means for connecting a first one of said supply conductors directly to a first terminal of the primary winding;
  (c) a first pair of hoisting controlled rectifier circuits connected between the second and third supply conductors and the second and third primary terminals respectively;
  (d) a second pair of lowering controlled rectifier circuits cross-connected between said second and third supply conductors and said third and second primary terminals;
  (e) a first pair of firing control circuits responsive to input voltages for applying firing voltages to the gates of the controlled rectifiers in said hoisting circuits to energize the motor for operation in the hoisting direction;
  (f) a second pair of firing control circuits responsive to input voltages for applying firing voltages to the gates of the controlled rectifiers in said lowering circuits to energize the motor for operation in the lowering direction;
  (g) and adjustable speed control means operable when adjusted in the hoisting direction for applying input voltages to said first pair of firing control circuits and operable when adjusted in the lowering direction for applying input voltages to said second pair of firing control circuits.

13. The invention defined in claim 12, wherein each said controlled rectifier circuit comprises:
  (a) at least one pair of controlled rectifiers;
  (b) means connecting the controlled rectifiers of said pair for conducting current in opposite directions between said source and the motor primary winding;
  (c) and semi-conductor diodes connected between the anodes and gates of the respective controlled rectifiers for shunting excessive anode voltages therefrom.

14. The invention defined in claim 12, wherein each said firing control circuit comprises:
  (a) a firing voltage transformer having a primary winding and a plurality of secondary windings connected to the gate-cathode junctions of the associated controlled rectifiers for applying firing voltages thereto when said primary winding is energized;

(b) a controllable semi-conductor device effective when rendered conducting for energizing the primary winding of said transformer;

(c) rectifier means supplied from across the associated controlled rectifiers for supplying a voltage to a circuit comprising said semi-conductor device in series with the primary winding of said transformer;

(d) a unidirectionally conducting diode connected in said series circuit normally to block current flow therethrough from said rectifier means;

(e) means for applying an unblocking voltage from across another controlled rectifier circuit which is connected to the same motor terminal to cause current flow in the forward direction through said diode thereby to allow a current of lesser magnitude to flow through the primary winding of said transformer when a control voltage is applied to said semi-conductor device;

(f) and discontinuance of said unblocking voltage causing said diode to prevent current flow to the primary winding of said transformer thereby to prevent a short circuit between said second and said third supply conductors by preventing firing of hoisting controlled rectifiers if the lowering controlled rectifiers connected to the same motor terminal are conducting current and vice versa.

References Cited by the Examiner

UNITED STATES PATENTS

| | | | |
|---|---|---|---|
| 1,376,453 | 5/1921 | Meyer | 318—227 |
| 2,440,319 | 4/1948 | Wickerham | 318—228X |
| 2,703,860 | 3/1955 | Large | 318—227 |
| 2,991,401 | 7/1961 | Collom | 318—345 X |
| 3,129,368 | 4/1965 | Burnett | 318—227 |

OTHER REFERENCES

Controlled Rectifier Manual, General Electric Rectifier Components Department, Auburn, New York, 1960, First edition.

SCR Manual, 2nd edition, General Electric Rectifier Components Department, Auburn, N.Y., 1961.

ORIS L. RADER, *Primary Examiner.*

JOHN F. COUCH, *Examiner.*

C. E. ROHRER, G. Z. RUBINSON, *Assistant Examiners.*